Dec. 4, 1962 A. F. RAFFAELLI 3,066,450
PAPER WALLBOARD TAPE
Filed July 29, 1957

INVENTOR.
Albert F. Raffaelli
BY James E. Rooney

United States Patent Office 3,066,450
Patented Dec. 4, 1962

3,066,450
PAPER WALLBOARD TAPE
Albert F. Raffaelli, Concord, Calif., assignor to Kaiser Gypsum Company, Inc., Oakland, Calif., a corporation of Washington
Filed July 29, 1957, Ser. No. 674,832
7 Claims. (Cl. 50—194)

This invention relates to a cellulose fiber strip or tape for use in the installation of wallboards, and more specifically it relates to a paper tape or strip for such use; and it further relates to a method of forming wallboard joints.

Thin cellulose tapes or strips or paper tapes or strips have long been known as useful in the installation of wallboard, such as fibrous or gypsum wallboard. Ordinarily, such tapes are from two to four inches in width and are either plain or perforated. The perforated strips are generally preferred in wallboard installations with the use of joint cement or adhesive because such perforations permit the escape of air from beneath the strip, and the joint cement or adhesive exudes through such perforations, providing a better joint. Of the perforated strips, three principal types have been known in the prior art, the one being a punched tape wherein rounded apertures or holes, about 1/16-inch in diameter, have been formed by punching out the tape; another, in which small perforations are made, for example, with needles; and the third type being the spark punch tape wherein the tape is passed through a device and acted upon by an electric spark which makes very small but well-formed perforations in the fibrous strip. The tape in general is a composition of vegetable or wood fibers, and in addition to the perforations, such strips are very often beveled or thinned down at the edges.

In making wall board joints, as is well known, the adjoining wallboards are brought into and fixed in abutting relationship, and joint cement or an adhesive substance is placed at and over the joint, or the site of abutment. Wallboard tape is then applied over the joint combination and is securely fixed by the cement or adhesive. The cement layer extends outwardly beyond the edges of the tape and when the tape contains large perforations, e.g., of 1/16-inch or more diameter, it exudes through the perforations. The tape is generally smoothed down and pressed closely against the cement or adhesive with the aid of a broadknife before the cement or adhesive will have dried. When the tape is spark-punched, the perforations are so small that the cement does not exude therethrough, but a small amount of liquid may come through. However, when the larger perforations mentioned are present, a "pimple" of cement forms on the top of the tape over a perforation, and this requires further smoothing and finishing. A further amount of cement is usually then applied over the joint combination which now includes the tape. However, it has been a difficulty and disadvantage with such installations that under rapid drying conditions, cracks develop in the joint cement along the tape edges and outside thereof. Building construction in hot climates or the installation of wall board on hot days or in windy and dry weather very often results in the development of such cracks in the cement. Sometimes these cracks extend quite a distance down into the cement and become longer and wider as drying progresses. The operator has frequently endeavored to cover such cracks by the application of further amounts of cement or by the application of plaster to the joint and over the joints, but very often the cracks then extend through the added cement or plaster and result in an unsightly wall surface. It can be readily understood that the production and treatment of such cracks slows down the rate of production or installation, even when the treatment may prove successful as in instances where the cracks may be very small. It has previously been proposed to overcome edge-cracking by serrating the tape edges or by forming an irregular edge contour, but this has not been very successful in practice in overcoming edge cracking; and has led to the further practical disadvantage that, in attempting to smooth the tape onto a joint, the irregular edges have been caught up by the broadknife and turned over to form an unsatisfactory and rough joint combination.

According to the present invention, the above difficulties and disadvantages are overcome, and more particularly, the edge-cracking in wall board joints is avoided by employing a wallboard tape which contains rows of discontinuous cuts or incisions adjacent and generally parallel to its longitudinal edges. The incisions lie wholly within the tape or strip.

The invention is illustrated by the annexed drawings, wherein

It has now been found that the formation of incisions or cuts in the tape adjacent the edges of the tape and generally parallel thereto effectively controls the development of such cracks. At least two rows of such cuts or incisions are provided in the tape and more can be provided. However, for most installations it has been found that two such rows are satisfactory in controlling the edge cracking.

The incisions are discontinuous and are generally from 1/8 to 1, preferably 1/4 to 3/4, inch in length. The incisions in each row are, as stated, discontinuous and are preferably spaced closely together. Preferably, the space between incisions, or distance from the end of one incision to the beginning of the next succeeding incision, in the same row is from 1/32 to 1/2 inch in length. The rows are disposed adjacent or close to the edge of the strip. Preferably, the outer row of incisions, that is, the row nearest the edge of the strip, is not over 3/8 inch or is from 1/16 to 3/8 inch inwardly from such edge. The inner row of cuts is preferably from 1/32 to 3/8 inch inwardly from the outer row, that is, it is displaced toward the center of the strip by such distance; and preferably is as close as possible to the outer row.

Figure 1:
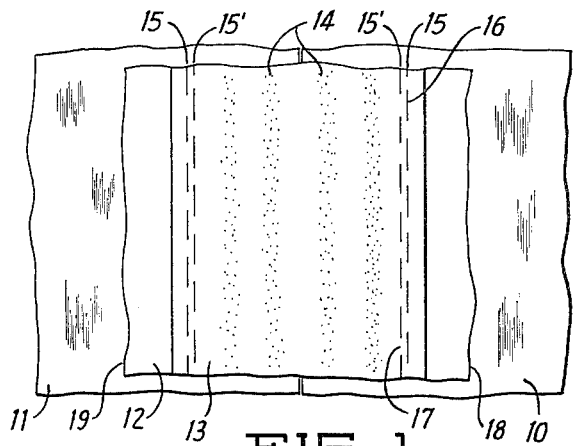
FIGURE 1 represents a top view of a wallboard joint combination according to the present invention.

The incisions in any row can be disposed opposite corresponding incisions in the adjacent row, but for the best results, especially when parallel to the edges, they should be in staggered relationship, as illustrated for example in FIGURE 1. For best results, it is also preferred that the incisions be relatively long as compared with the space between the incisions in the same row. It is further preferred, as stated above, that the parallel rows of incisions be disposed closely adjacent each other. It is preferred, also, that the incisions be parallel to the longitudinal axis of the paper or, in other words, at an angle of 0° to such longitudinal axis; but in another embodiment the incisions in any row can be disposed at a diagonal, or at an angle to such axis, slanting in either direction, but should be at an angle of less than 45° to such axis. For example, there can be employed a tape having one row of parallel, or straightline incisions, and a second row of such diagonal incisions; or in still another embodiment, any desired combination of straightline, and such diagonal incisions can be disposed in any given row. The outermost point of such diagonal incisions, if in the outer row thereof, must always be spaced slightly inwardly from the edge of the tape and preferably is from 1/16 inch to 3/32 inch inward from such edge. Also, the outermost point of a diagonal row should be suitably spaced from the outermost point of any adjacent row, preferably from 1/32 to 3/8 inch therefrom. However, for cheapness and ease of manufacture of the tape and for best results in the joint combination, parallel or straight-line incisions are preferred. The lengths of the incisions and the distances therebetween can, if desired, vary in any given row or can be different in different rows.

The wallboard tape employed in this invention is preferably from two to four inches in width and is either plain or is perforated in any desired manner. The tape is beveled, feathered, or thinner at the edges than at the central portion, if desired.

The wallboard tape can be incised or cut by any desired means. For example, it can be drawn beneath a roller or rollers having spaced cutting teeth, which will form incisions of the desired length and spaced from each other by the desired amount. The incisions can be made during manufacture of the tape, or they can be applied after the tape has been completed.

In making up a wallboard joint according to the present invention, it has been found that the edge cracking is entirely or substantially prevented. Wallboard tape is primarily used in dry-wall construction as a reinforcement for joint compounds, in order to produce a strong joint, as well as a smooth, generally invisible joint between abutting wallboard panels, suitable for subsequent decoration. In conventional joint treatment of dry wall construction, under certain drying conditions of temperature and humidity, the dry joint compound will have formed cracks or checking, which parallel one or both the edges of the wallboard tape. The so-called "edge cracks" can be fine hair line cracks or larger, depending on the joint compound and the drying conditions. The cracks may be caused when evaporation from the surface of the paste joint compound occurs at a faster rate than that at which moisture is replaced by diffusion from within. An excessive rate of surface shrinkage can occur, resulting in compression and strains. If the strength of the shrinking surface layer is not sufficient to withstand the strains, cracks or uniform breaks in the material will be formed. These cracks, fine at first, often become larger and often penetrate far into the body of the material before drying is completed.

In addition to the possible strains formed by the accelerated shrinkage of the joint compound, it is believed that there is the additional strain caused by the drying and shrinkage of the conventional wallboard tape. When the wallboard tape is placed in the joint paste, water is believed absorbed by the paper and the tape expands in both directions, width and lengthwise. On drying, the tape will then shrink or contract, causing additional strains on the surface of the drying joint compound and can result in "edge cracks" or at least can enlarge such cracks. Such edge cracks, when formed, dilate and constrict with changes in temperature and with changes in moisture content of the body of the joint compound. This free expansion and contraction can cause the cracks to work through subsequent layers of joint compound and through coats of paints so that the final result is not acceptable. Any corrective measures taken to eliminate the cracks are time consuming and costly. It is believed that the tape of the present invention overcomes these disadvantageous effects in that the contraction of the tape is compensated for, and the stresses in the drying joint cement relieved, by the incisions or cuts. However, these are present theories or possible explanations only of the mode of operation of the invention, and it is not intended to be limited thereby.

It is an advantage of the present invention that the wallboard joint so formed is free or substantially free of edge-cracking, even when installed under severe adverse conditions of weather, or of heat or drying conditions. It is a further advantage that the incisions are not visible after a finishing coat of joint cement or plaster is applied over the joint combination. It is a still further advantage that the tape remains strong and of smooth finish during application, and is not furled, folded over or adversely affected upon smoothing down with the broadknife.

The figures attached hereto illustrate more clearly the advantageous results and the mode of operation of the present invention. In FIGURE 1 adjacent paper-covered, gypsum core wallboards 10 and 11, of conventional manufacture and having tapered edges, are disposed in abutting relationship, the abutment or joint being shown in FIGURE 2, wherein the same numerals refer to the same respective elements. The joint is covered with joint cement 12. There is then laid over this abutment joint wallboard tape 13, which in this embodiment is perforated as shown at 14, and has beveled or thinned edges, as shown at 23, FIG. 2. The tape also contains two rows 15 and 15' at each edge of the tape and parallel thereto, 15 being the outer and 15' the inner row. These rows are made up of individual incisions 16 which are each about 1/4 inch in length and which are spaced from each other as at 17 by a distance of about 1/8 inch. The tape 13 is laid over the joint cement 12 so as to overlie the joint formed by the abutting edges of wallboards 10 and 11. Joint cement 12 extends beyond the edges of the wallboard tape 13 at both sides thereof as shown at 18 and 19. In most installations a further layer of joint cement is applied over the tape 13, although not shown in this illustration. The joint is then allowed to dry and harden.

Figure 2:
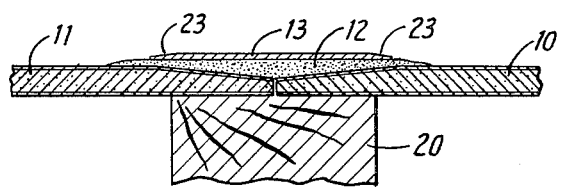
FIGURE 2 is a sectional view through the joint of FIGURE 1.

FIGURE 2 shows the wallboard joint of FIGURE 1 in section, and illustrates its general composition more clearly. Wallboards 10 and 11 are fastened by nails (not shown) to a stud 20, and joint cement 12 and wallboard tape 13 are then applied, the thickness of the tape being exaggerated in order to illustrate this embodiment.

Figure 3:
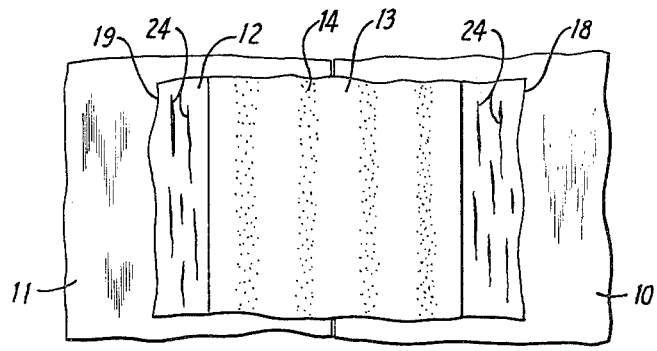
FIGURE 3 represents a wallboard joint according to the prior art, showing the edge cracks which develop in the dried cement.

FIGURE 3 illustrates a wallboard installation or joint made according to the prior art and in which all of the construction elements are the same as in FIGURE 1, except that the tape 12, which is provided with perforations 14 and which has a beveled edge just as the tape shown in FIGURE 2, is not provided with the rows of incisions 15 and 15'. Like elements in FIGURES 1 and 3 are designated by the same numbers. In addition, FIGURE 3 shows the cracks 24 which develop along the edges of the tape and in the joint cement when the construction of the prior art is dried rapidly, as will occur under hot or windy and dry weather conditions. These cracks lead either to unsightly wall finishes or require considerable expense of time and labor in overcoming the condition by the application of further amounts of cement and/or of plaster.

Figure 4:
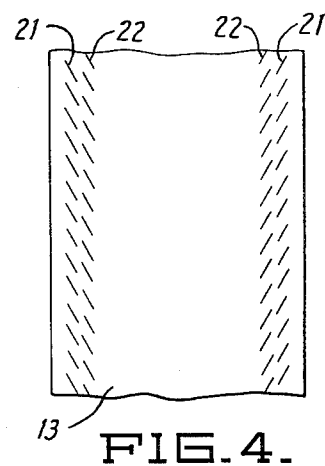
FIGURE 4 shows another embodiment of the wallboard tape.

In the wallboard tape 13 illustrated in FIGURE 4, there are shown two rows of incisions, 21, 22, at each edge, wherein each incision is diagonal, or is disposed at an angle of less than 45° to the longitudinal axis of the tape. It will be understood that each row 21 can also be of parallel or straight-line incisions, and each row 22 of diagonal incisions, or vice versa, as described hereinabove. Alternatively, each row 21 or each row 22, or both, can contain both such parallel and diagonal incisions. No perforations are shown in FIG. 4, but the tape of this embodiment can also contain perforations of any known type.

Figure 5:
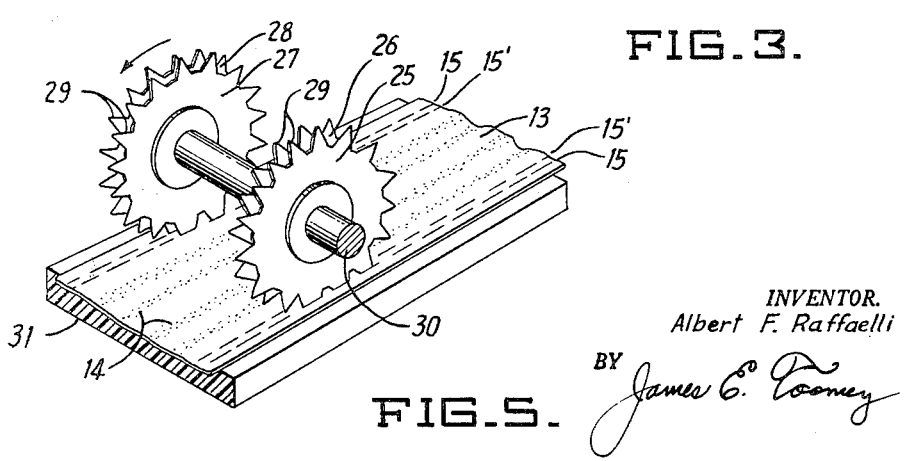
FIGURE 5 is a perspective view of a device suitable for making the tape of the present invention.

FIGURE 5 represents schematically one form of device for making tape of the present invention. In this device there are provided four wheels of any suitable and of equal size, 25, 26, 27 and 28. Wheels 25 and 26 are disposed adjacent each other, and wheels 27 and 28 are likewise adjacent each other, the outer wheels 28 and 25 being so adjusted that the incisions which they form will lie the desired distance inwardly from the edges of tape 13 as will become clear from the further description below. Likewise, wheel 26 is spaced from wheel 25, and wheel 27, from wheel 28, to provide the desired spacing between rows 15 and 15' of the tape incisions. Each wheel is provided with sharpened or knife edge teeth 29, notched into the outer rim of each wheel, and the wheels are mounted on a common axle or drive shaft 30 and driven by means of any desired power source, not shown. In the preferred operation, the wheels are so adjusted that the teeth 29 of each pair of wheels, pair 25 and 26 and pair 27 and 28, are staggered with respect to each other, so that the incisions in the resulting pairs of rows will be staggered with respect to each other as further described herein. The tape 13, having in this embodiment perforations 14, is fed onto a base 31 of soft material, such as a plastic, and is drawn forwardly by any desired means under the cutting teeth of the wheels. The wheels rotate in the direction of the arrow and as the tape 13 passes under the wheels, the cutting teeth 29 incise the tape and penetrate into the soft base a sufficient distance to provide the desired length of incision which, it will be understood, will depend upon the angle or pitch of the tooth. As tape 13 emerges from under the wheels, it will contain rows 15, 15' of the desired incisions. The distance between adjacent teeth on a given wheel is so selected as to provide the desired space between adjacent incisions in a given row. It will be understood that other means than those described above can be employed for forming incisions and making the tape of this invention.

In a series of tests according to this invention, a casein-base joint cement, as well known in commerce in this art, is applied in each test to a two-foot length of gypsum-core wallboard, to a thickness of about 0.075 inch. There is applied in tests B, C, D and E wallboard tape such as that shown in FIGURE 1, having two rows of ¼ inch long incisions at each edge of the tape, a space of ⅛ inch between succeeding incisions in each row, and a space of 1/16 inch between adjacent rows; the space between the outer row and the edge of the tape being shown in the Table below. In one test, A, an exactly similar tape is used except that no incisions are present in this tape. In each of tests A to E, the perforated tape employed is laid over the joint cement upon the wallboard and is wiped down with a broad-knife in such manner that one edge of the tape has approximately 0.010 inch thickness of joint cement under it, while the other edge of the tape has 0.075 inch thickness of the cement beneath it. Each test panel is then placed in a drying oven at 120° F. and from 5 to 15% relative humidity until dry; and the joint cement is then examined for the presence of cracks along the edge of the tape over the thick portion of the joint cement which corresponds to the portion of the cement lying outside the tape, e.g., as in FIGURES 1 and 3.

The results are shown in the following table.

Table

| Conditions | A | B | C | D | E |
|---|---|---|---|---|---|
| Relative humidity, percent | 10 | 10 | 10 | 5 | 7 |
| Location of rows from edge of tape: | | | | | |
| First row, inch | (1) | ⅛ | 3/16 | ⅛ | ⅛ |
| Second row, inch | (1) | 3/16 | ¼ | 3/16 | 3/16 |
| Edge cracks | Yes | None | Slight | None | None |
| Relative cracking, percent of length | 100 | | 5 | | |

¹ No incisions.

It can be seen from the above table that edge cracking is substantially prevented or avoided by the present invention, even under the severe conditions of low humidity, e.g., 5% relative humidity.

The joint cement or adhesive employed in the present wallboard joint is of any desired type. For instance, in the embodiment of FIGURE 1 above, there is employed a joint cement as described and claimed in Riddell and Kirk, U.S. Patent 2,662,024, issued December 8, 1953; but, alternatively, there is employed any other desired joint cement or adhesive, such as a casein-base or proteinaceous joint cement, useful in making wallboard joints. The wallboards described in FIGURE 1 are paper-covered, gypsum core boards of known construction, but this invention is also applicable in wallboard joints wherein the boards are of fibrous or paper pulp material, or in any construction where a joint cement is applied in combination with a paper or fibrous tape and where edge-cracking has hitherto occurred. In this specification and claims the term "joint cement" is intended to include those compositions generally called such cements in this art, and adhesive compositions useful as such joint cements, wherein edge-cracking normally tends to occur or has hitherto occurred in prior art practice. The term "beveled edge" is intended to describe a wallboard tape which is thinner at the edge than in its central portion, and such tapes are well known in this art. The cuts, slits or incisions incorporated in the tape as described are very narrow in relation to their lengths, and there is no substantial penetration of joint cement into such cut, whereby free movement of the edges of the cut is ensured, forming what may be called an expansion joint in the tape.

Having now described the invention, what is claimed is:

1. A wallboard tape for overlying the cement and joint between abutting wallboards in dry wall construction, consisting of a paper strip of from 2" to 4" in width, and having an inner and an outer row of closely spaced incisions disposed adjacent each edge of said strip, each incision being about ¼" in length, each said outer row being disposed inwardly about ⅛" from each said edge, and each said inner row being disposed inwardly about 1/16" from each said outer row, each of said incisions being disposed parallel to the longitudinal axis of the tape and being of such configuration as to substantially prevent penetration of joint cement therethrough and to relieve stresses in the drying joint cement.

2. An expansion tape for overlying the cement and joint between abutting wall boards in dry wall construction, consisting of an elongated, thin cellulose fiber strip having at least two rows of closely spaced discontinuous incisions parallel and adjacent to each edge of the strip, each outer row of said incisions being disposed at from one-sixteenth inch to three-eighth inch for each said edge, each row of said incisions being disposed closely adjacent to each other row, said incisions in said adjacent rows being in staggered relationship, each of said incisions being from one-eighth to one inch in length, said incisions in each row being spaced from one-thirty second inch to one-half inch apart, and being of such configuration as to substantially prevent penetration therethrough of said joint cement and to relieve stresses in the drying joint cement, each said incision being at an angle of from 0° to less than 45° to the longitudinal axis of said strip.

3. An expansion tape for overlying the cement and joint between abutting wall boards in dry wall construction, consisting of an elongated, thin cellulose fiber strip having at least two rows of closely spaced discontinuous incisions parallel and adjacent to each edge of the strip, each outer row of said incisions being disposed at from one-sixteenth inch to three-eighth inch from each said edge, and each row of said incisions being disposed closely adjacent to each other row, said incisions in said adjacent rows being in staggered relationship, each of said incisions being parallel to the longitudinal axis of said tape, and being from one-fourth to three-fourth inch in length and of such configuration as to substantially prevent penetration therethrough of said joint cement and to relieve stresses in the drying joint cement.

4. An expansion tape for overlying the cement and joint between abutting wall boards in dry wall construction, consisting of an elongated, thin cellulose fiber strip having at least two rows of closely spaced discontinuous incisions parallel and adjacent to each edge of the strip, each outer row of said incisions being disposed at from one-sixteenth inch to three-eighth inch from each said edge, each row of said incisions being disposed closely adjacent to each other row, each of said incisions being from one-eighth to one inch in length and being spaced from one-thirty second inch to one-half inch apart and of such configuration as to substantially prevent penetration therethrough of said joint cement and to relieve stresses in the drying joint cement, each said incision being at an angle of from 0° to less than 45° to the longitudinal axis of said strip.

5. An expansion tape for overlying the cement and joint between abutting wall boards in dry wall construction, consisting of an elongated, thin cellulose fiber strip having at least two rows of closely spaced discontinuous incisions parallel and adjacent to each edge of the strip, each outer row of said incisions being disposed at from one-sixteenth inch to three-eighth inch from each said edge, each row of said incisions being disposed closely adjacent to each other row, each of said incisions being parallel to the longitudinal axis of said tape and being from one-fourth inch to three-quarters inch in length and such configuration as to substantially prevent penetration therethrough of said joint cement and to relieve stresses in the drying joint cement.

6. An expansion tape for overlying the cement and joint between abutting wall boards in dry wall construction, consisting of an elongated, thin cellulose fiber strip having at least a pair of rows of closely spaced, elongated, narrow incisions parallel and adjacent to each edge of said strip, the rows of each said pair being closely adjacent each other, said incisions being of such configuration as to substantially prevent penetration therethrough of joint cement and to relieve stresses in the drying joint cement, each said incision being at an angle of from 0° to less than 45° to the longitudinal axis of said strip.

7. An expansion tape for overlying the cement and joint between abutting wall boards in dry wall construction, consisting of an elongated, thin cellulose fiber strip having at least two rows of closely spaced incisions parallel and adjacent to each edge of said strip, each of said incisions being from one-eighth to one inch in length and of such configuration as to substantially prevent penetration therethrough said cement and to relieve stresses in the drying cement, each said incision being at an angle of from 0° to less than 45° to the longitudinal axis of said strip.

References Cited in the file of this patent

UNITED STATES PATENTS

| | | |
|---|---|---|
| 1,433,077 | Hansen | Oct. 24, 1922 |
| 2,047,982 | Page | July 21, 1936 |
| 2,667,822 | Christman | Feb. 2, 1954 |
| 2,731,890 | Bechle | Jan. 24, 1956 |
| 2,836,243 | Bedinghaus | May 27, 1958 |
| 2,850,404 | Dunlop | Sept. 2, 1958 |

FOREIGN PATENTS

| | | |
|---|---|---|
| 580,999 | Great Britain | 1946 |